Aug. 22, 1939.  J. W. CULBERTSON  2,170,527
CENTERING DEVICE FOR DRIFT RECORDING INSTRUMENTS
Filed Oct. 23, 1936    2 Sheets-Sheet 1
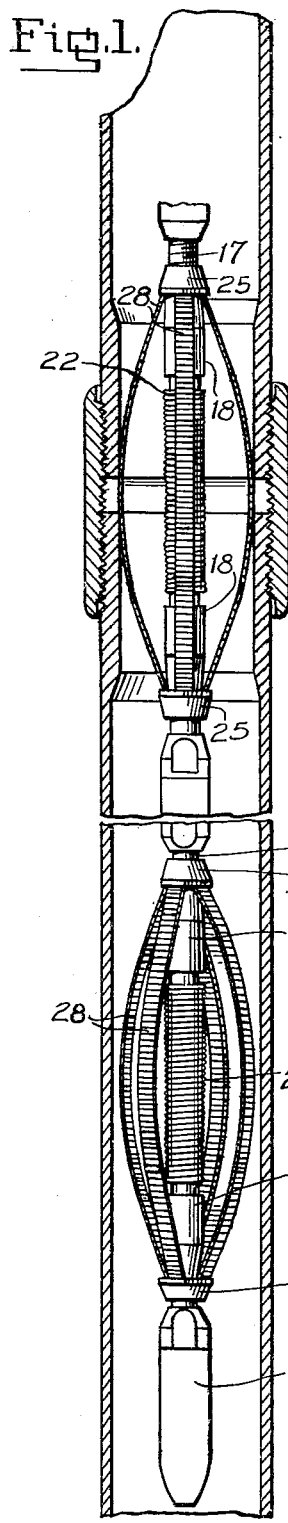
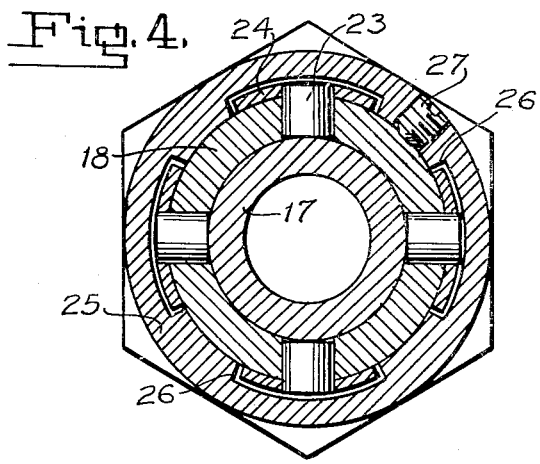
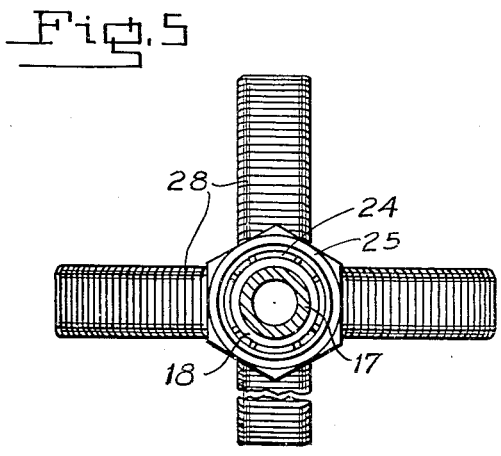
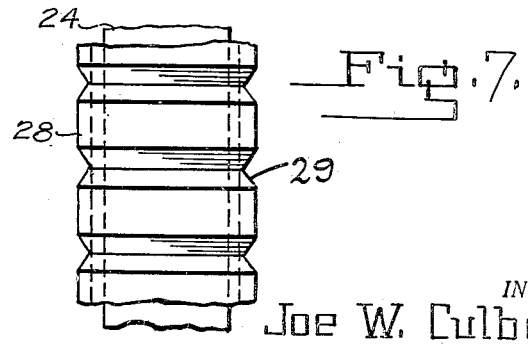
INVENTOR.
Joe W. Culbertson
BY
ATTORNEY.

Aug. 22, 1939.  J. W. CULBERTSON  2,170,527
CENTERING DEVICE FOR DRIFT RECORDING INSTRUMENTS
Filed Oct. 23, 1936  2 Sheets-Sheet 2
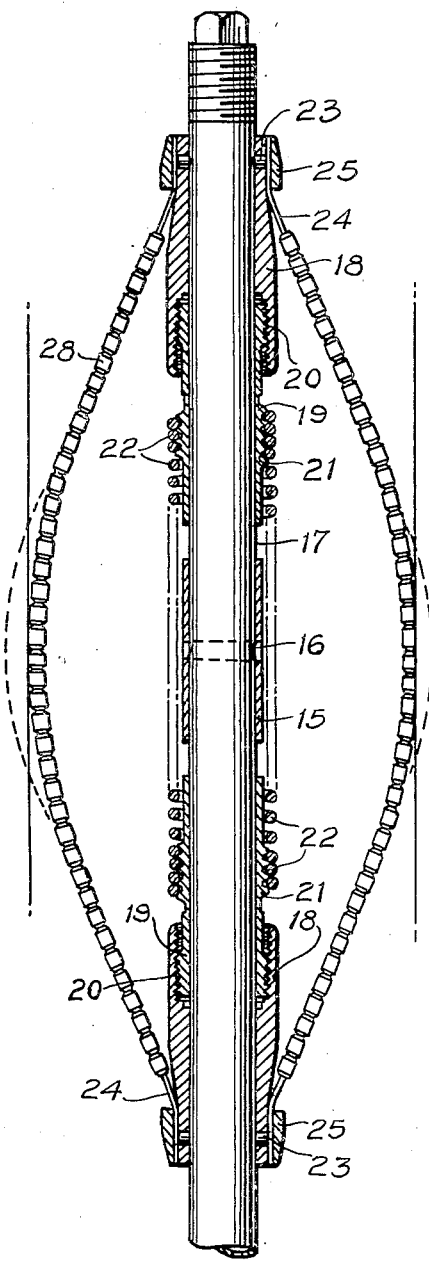
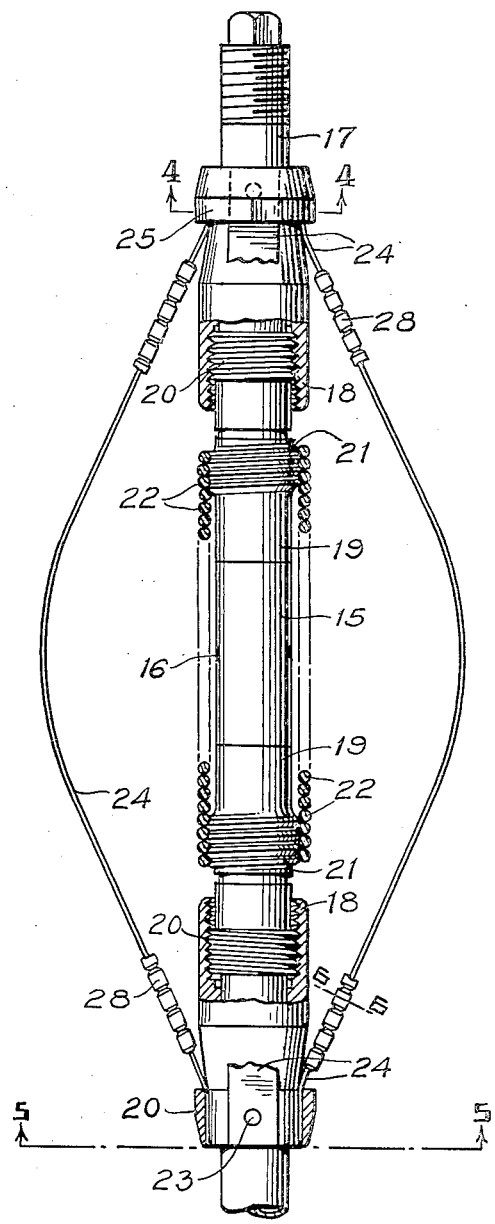
Joe W. Culbertson INVENTOR.
BY Edwin D. Jones
ATTORNEY.

Patented Aug. 22, 1939

2,170,527

UNITED STATES PATENT OFFICE 2,170,527

CENTERING DEVICE FOR DRIFT RECORDING INSTRUMENTS

Joe W. Culbertson, West Hollywood, Calif., assignor to Technical Oil Tool Corporation, Ltd., a corporation of California Application October 23, 1936, Serial No. 107,218

13 Claims. (Cl. 308—4)

My invention relates to apparatus for recording the drift or inclination from the vertical of an oil well or other earth bore, and it has particular reference to that type of apparatus embodied in my co-pending application, Ser. No. 14,479, filed April 3, 1935, which is adapted to be dropped or lowered into a drill pipe.

Three major factors enter into the damage of a drift recording apparatus of the character embodied in my aforesaid application, when dropped or lowered on a line into a drill pipe. One factor is the speed of descent of the apparatus which determines the force with which it strikes the drill bit stem, baffle plate or other object of stoppage. Another factor is the severe axial shocks to which the appartus is subjected as it successively strikes the tool joints. The third factor is the side sway of the apparatus as it proceeds down the pipe in a synchronous motion which sets the housing of the apparatus into such molecular vibration as to cause crystallization of the metal of which the housing is formed.

It is a purpose of my invention to provide one or more devices which in association with a drift recording apparatus functions to maintain the apparatus centered in a drill pipe when dropped or lowered thereinto, and thus prevent it from striking the tool joints and couplings or the pipe walls, and yet, at the same time, so controlling the speed of descent of the apparatus as to prevent damage thereto when it finally strikes the drill bit or baffle plate.

It is also a purpose of my invention to provide a device of the character described which embodies a cage made up of bowed springs yieldingly held in bowed form by other means than the springs themselves so as to permit the use of relatively light springs and yet cause the cage to maintain the apparatus centered in the drill pipe in a manner to permit the cage to contract in passing the tool joints and couplings of the pipe and to expand into centering contact with the pipe after passing such joints and couplings.

Another purpose of my invention is to provide a device of this character which embodies a spring cage tapered at its opposite ends to slide freely over any and all wall projections during either ascension or descension of the housing whereby the apparatus can be freely withdrawn from an open hole or drill pipe when lowered on a line.

A further purpose of my invention is the provision of a spring cage, the greatest diameter of which can be varied to permit the cage to be accommodated in drill pipes of different inside diameters, and properly function in each instance.

A still further purpose of my invention is the provision of a spring cage in which can be effected the ready individual detachability of the springs so that should a spring break for any reason it can be easily replaced.

Another purpose of my invention is the provision of protecting coverings for the springs of the cage which do not interfere with the resiliency of the springs and yet protect the springs against wear and breakage.

I will describe only one form of centering device embodying my invention and will then point out the novel features thereof in claims.

In the accompanying drawings:

Fig. 1 is a view showing in side elevation two centering devices embodying my invention in applied position to the housing of a drift recording apparatus.

Fig. 2 is a view showing the upper centering device disposed in contracted and in longitudinal section on the apparatus housing.

Fig. 3 is a view similar to Fig. 2 with the device in expanded position.

Fig. 4 is an enlarged transverse sectional view taken on the line 4—4 of Fig. 3 and looking in the direction of the arrows.

Fig. 5 is a transverse sectional view taken on the line 5—5 of Fig. 3 and looking in the direction of the arrows.

Fig. 6 is an enlarged transverse sectional view taken on the line 6—6 of Fig. 3.

Fig. 7 is an enlarged fragmentary view showing certain of the protecting sleeves in applied position on a spring.

In the present embodiment of my invention two devices identical in construction have been shown in Fig. 1. Each device comprises an abutment sleeve 15 receiving and fixed by a transverse pin 16 to a tubular and elongated hollow shaft housing 17 in which an instrument (not shown) is contained for recording the drift or inclination of a well hole from the vertical. The lower end of this housing carries a spear 17ª. Mounted for free sliding movement on the housing 17 at opposite sides of the abutment sleeve are units or heads each comprising a connecting sleeve 18 and an adjusting sleeve or bushing 19 screw-threaded as at 20 into the connecting sleeve.

Each adjusting sleeve 19 is formed on its exterior with helical and wedge shaped grooves 21 in which are seated the end convolutions of a helical contractile spring 22. The manner of associating the spring ends with the grooves of both adjusting sleeves is such that the spring grips the sleeves with such security as to fix the spring to the sleeves for rotation therewith. Thus the spring provides in effect an actuating sleeve for the adjusting sleeves so that by rotation of the spring both adjusting sleeves can be rotated on the housing and in either direction.

Right hand threads 20 connect the upper sleeves 18 and 19, while left hand threads 20 connect the lower sleeves 18 and 19. Thus, the two adjusting sleeves 19 and the spring 22 coact to form a turnbuckle which when operated acts to feed the connecting sleeves outwardly or inwardly axially of the housing 17 according as the spring is rotated in one direction or the other. In this manner also the effective tension of the helical spring is varied because the spring is lengthened or shortened as the spacing of the adjusting sleeves is increased or decreased.

The outer or remote ends of the two connecting sleeves 18 are slightly tapered exteriorly and provided with pins 23 extending radially from the sleeve and circumferentially spaced, as shown in Fig. 3. The projecting ends of these pins extend into holes in the ends of bowed springs 24, and the spring ends are confined on the pins by collars 25 grooved internally as at 26 to receive the spring ends and secured on the connecting sleeves by set screws 27.

This structural organization functions to fixedly secure the springs to the connecting sleeves against endwise as well as lateral displacement so that they are maintained in definite spaced relation circumferentially of the housing to form what I term a spring cage. By virtue of the bowed form of the springs the cage is tapered toward both of its ends from its greatest diameter medially thereof. In spite of the security with which the springs are held on the connecting sleeves, should one of the springs break, it only requires the removal of the collars 25 to substitute a new spring.

In my device relatively light springs 24 can be used, hence it is desirable that they be protected against wear and breakage. For this purpose a metal covering for each spring is provided which is fabricated in such manner as not to interfere with the flexibility of the spring so that it can be bowed or flattened to any degree required.

In each instance the covering is made up of a multiplicity of sleeves 28 each loosely fitted on the spring (Fig. 6), and those edges confronting an abutting sleeve are beveled as indicated at 29 in Fig. 7. By so beveling its edges any one sleeve is freely movable laterally without binding against an abutting sleeve and restricting flexing of the spring. Thus, a covering as so constructed possesses that flexibility necessary to allow free flexing of the spring, and yet it effectively protects the spring against wear and the possibility of breakage.

When my device is not within a drill pipe, its parts normally occupy the positions shown in Fig. 3 wherein the adjusting sleeves 19 abut the fixed sleeve 15 under the contracting action of the helical spring 22. As the connecting sleeves 18 are connected to the adjusting sleeves and to the bowed springs 24, the helical spring constantly acts to maintain the bowed springs in bowed form and to yieldingly resist inward flexing thereof when radial pressures inwardly are exerted on the springs such that when the radial pressures are removed the springs are returned to their normal form of bow.

Depending upon the inside diameter of the drill pipe in which the device is to be used, determines the medial diameter of the cage. From the maximum medial diameter illustrated in Fig. 3 which is suitable for large pipe, the cage can be decreased to fit within pipe of smaller diameter by rotation of the helical spring to the right as when viewed in Fig. 1, thereby feeding the connecting sleeves outwardly to elongate the bowed springs and thus decrease their degree of bow until the cage is reduced to the required medial diameter.

Where the housing 17 is of considerable length, two of my devices are employed and mounted adjacent the respective ends of the housing, as shown in Fig. 1. Before inserting the housing into a drill pipe of a particular diameter, and after determining the gravity of the circulating fluid used in the drill pipe, or ascertaining any other factor which affects the speed of descent of the housing, the cage of each device is adjusted so that its medial diameter is sufficiently greater than the inside diameter of the drill pipe as to cause the bowed springs when inserted to exert pressures radially outward against the pipe sufficient in degree not only to maintain the housing centered against any side sway but to regulate the speed of descent of the housing so that it will not be damaged when the spear strikes the drill stem or baffle plate. With this adjustment of the two devices the housing provided with the spear 17a at its lower end, is dropped or lowered on a line into the drill pipe, and as either device traverses a tool joint or coupling the bowed springs thereof are first flexed inwardly to pass the joint or coupling without transmitting shock to the housing and then sprung outwardly into contact with the pipe wall to continue to maintain the housing centered or spaced from the pipe wall. Manifestly, inward flexing elongates the bowed springs to increase the tension of the helical spring so that the latter functions positively to move the springs back into contact with the pipe wall.

Although I have shown and described my device in association with a drift recording apparatus adapted to be dropped or lowered in a drill pipe, it is to be understood that my device is equally effective in operation with an apparatus when lowered on a line in an open hole, and that by virtue of the tapered construction of the cage of the device, the apparatus with my devices thereon can be easily withdrawn from an open hole or drill pipe, and in the latter instance without the necessity of withdrawing the drill pipe.

I claim:

1. In combination; a housing; a pair of sleeve units slidable on the housing and each comprising a connecting sleeve and an adjusting sleeve threaded into the latter, the threads of one adjusting sleeve and its companion connecting sleeve being the reverse of those of the other sleeves; a cage comprising bowed springs secured to and connecting the connecting sleeves and acting to urge the latter away from each other; an actuating sleeve fixed to and connecting said adjusting sleeves so that by rotation of the actuating sleeve the adjusting sleeves will be moved likewise to vary the spacing of the connecting sleeves lengthwise on the housing and thus vary the bow in said springs to increase or decrease the maximum outside diameter of the cage according as the actuating sleeve is rotated in one direction or the other; and an abutment fixed to the housing between the adjusting sleeves for limiting movement of the latter toward each other.

2. A combination as embodied in claim 1 wherein said actuating sleeve comprises a helical contractile spring, and said adjusting sleeves are formed with grooves in which the end convolutions of said spring engage.

3. In combination; a drift recording apparatus housing of elongated form; a pair of members mounted on said housing for sliding movement; a cage comprising bowed springs fixed to and connecting said members so that by varying the spacing of the members on the housing the degree of bow of said springs is varied accordingly to vary the maximum outside diameter of the cage; and a turnbuckle connecting said members and mounted on said housing for varying the spacing of said members.

4. A centering device for the housing of a drift recording apparatus, comprising: a pair of members adapted for sliding movement upon a housing; bowed springs fixed to and connecting the members; and a spring adjustably connecting the members and urging the latter toward each other so as to resist elongation of the bowed springs.

5. A centering device for the housing of a drift recording apparatus comprising: a plurality of springs; a pair of sleeves fixed to the ends of said springs; and a turnbuckle connecting said sleeves so as to normally maintain the springs in bowed form and to vary the degree of bow thereof in accordance with the spacing of said sleeves with respect to each other.

6. A centering device for the housing of a drift recording apparatus, comprising: a pair of sleeves; bowed springs; coacting means on the springs and sleeves for individually and detachably securing the springs to the sleeves; and a turnbuckle connecting the sleeves to each other.

7. A centering device for the housing of a drift recording apparatus, comprising: a pair of sleeves; pins in the sleeves; bowed springs having their respective ends formed with openings receiving the respective pins; collars on the sleeves for confining the springs against displacement from said pins; and a turnbuckle connecting said sleeves.

8. A centering device for the housing of a drift recording apparatus, comprising: a pair of connected sleeves; pins in the sleeves; bowed springs having their respective ends formed with openings receiving the respective pins; and collars on the sleeves for confining the springs against displacement from said pins and having grooves therein to receive said springs.

9. A centering device for the housing of a drift recording apparatus comprising: a pair of sleeves; bowed springs connecting the sleeves; and a turnbuckle connecting the sleeves and including a helical contractile spring for urging the sleeves toward each other.

10. A centering device for the housing of a drift recording apparatus, comprising: a plurality of outwardly bowed springs arranged in the form of a cage; means connected to the ends of said springs for varying the effective length thereof to vary the degree of bow thereof and to thereby vary the greatest diameter of the cage; and a contractile spring connected to said means for resisting elongation of said springs.

11. In combination; a housing; a pair of sleeve units slidable on the housing and each comprising a connecting sleeve and an adjusting sleeve threaded into the latter, the threads of one adjusting sleeve and its companion connecting sleeve being the reverse of those of the other sleeves; a cage comprising bowed springs secured to and connecting the connecting sleeves and acting to urge the latter away from each other; and a helical spring fixed to said adjusting sleeves so that by rotation thereof the adjusting sleeves will be moved lengthwise to vary spacing of the connecting sleeves on the housing and to thereby vary the bow in said springs according as the helical spring is rotated in one direction or the other.

12. In combination; a housing; a pair of sleeve units slidable on the housing and each comprising a connecting sleeve and an adjusting sleeve threaded into the latter, the threads of one adjusting sleeve and its companion connecting sleeve being the reverse of those of the other sleeve; a cage comprising bowed springs secured to and connecting the connecting sleeves and acting to urge the latter away from each other; and an actuating sleeve fixed to and connecting said adjusting sleeves so that by rotation of the actuating sleeve the adjusting sleeves will be moved likewise to vary the bow in said springs to increase or decrease the maximum outside diameter of the cage according as the actuating sleeve is rotated in one direction or the other.

13. In combination; a housing; a pair of sleeve units slidable on the housing and each comprising a connecting sleeve and an adjusting sleeve threaded into the latter, the threads of one adjusting sleeve and its companion connecting sleeve being the reverse of those of the other sleeves; a cage comprising bowed springs secured to and connecting the connecting sleeves and acting to urge the latter away from each other; and a helical contractible spring having its convolutions engaging in the threads of the adjusting sleeves.

JOE W. CULBERTSON.